United States Patent
Kuba

(10) Patent No.: US 6,549,958 B1
(45) Date of Patent: Apr. 15, 2003

(54) CONNECTOR FOR COUPLING ELECTRONIC IMAGING SYSTEM WITH USB THAT SELECTIVELY SWITCHES USB HOST CONTROLLER AND USB INTERFACE WITH CONNECTOR

(75) Inventor: Hirokazu Kuba, Tokyo (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/471,684

(22) Filed: Dec. 23, 1999

(30) Foreign Application Priority Data

Dec. 25, 1998 (JP) .............................. 10-370495

(51) Int. Cl.[7] .............................. G06F 3/00; G06F 13/00
(52) U.S. Cl. .............................. 710/14; 710/8; 710/16; 710/38; 710/62; 710/63
(58) Field of Search .............................. 710/8, 16, 38, 710/62, 63, 14

(56) References Cited

U.S. PATENT DOCUMENTS 5,784,581 A * 7/1998 Hannah ..................... 710/110
6,115,137 A * 9/2000 Ozawa et al. ............... 358/1.6

* cited by examiner

*Primary Examiner*—Jeffrey Gaffin
*Assistant Examiner*—Tammara Peyton
(74) *Attorney, Agent, or Firm*—Straub & Pokotylo; John C. Pokotylo

(57) ABSTRACT

An electronic camera 1 is disclosed, which has a USB host detector 51 for checking whether a host computer other than itself is connected to a universal series bus. When it is detected that no host computer other than the camera 1 is connected, a host mode is set, in which a USB host controller 52 is operated to set the camera 1 as host. When it is detected that a host computer other than the camera 1 is connected, a terminal mode is set, in which the camera 1 is operated under control of the other host computer.

21 Claims, 5 Drawing Sheets

CONNECTOR FOR COUPLING ELECTRONIC IMAGING SYSTEM WITH USB THAT SELECTIVELY SWITCHES USB HOST CONTROLLER AND USB INTERFACE WITH CONNECTOR

BACKGROUND OF THE INVENTION

The present invention relates to electronic imaging systems and, more particularly, to an electronic imaging system permitting transmission and reception of image data via a universal serial bus.

Recently, a data signal transmitting and receiving means called universal serial bus (USB) has been proposed as the digital data transmitting and receiving means connecting a personal computer or the like and a peripheral unit. Such USB permits inter-connection of a plurality of CPU-incorporating units just like a so-called LAN network by using a host computer, which is a personal computer having USB control function.

In the mean time, electronic cameras for recording photographed images as digital data, find various data utilizing applications by connecting a personal computer or like processor to them. Furthermore, an electronic camera itself may be utilized as a terminal unit of a personal computer through connection to the USB. In this case, it is readily possible to permit image data obtained in photography in an electronic camera to be printed out in a printer or stored in various recording media under control of a personal computer as host CPU.

FIG. 9 is a view for describing an example of data utilizing application of the electronic camera connected to the USB with a personal computer connected thereto as a host. In the illustrated application, a digital electronic camera 101 is connected to an USB 102, which is controlled by a personal computer 100 serving as host CPU. A printer 103 and a recording medium 104 are further connected to the USB. In this system, the personal computer 100 outputs control signal by judging terminal units connected to the USB. Each terminal unit connected to the USB sends out the data or the like in synchronism to the control signal. In this way, the image data obtained in the electronic camera 101 may be printed in the printer 103 or recorded in the recording medium 104.

However, in the above system using the USB, each terminal unit connected to the USB should be controlled by the personal computer as host CPU. Therefore, in a case where only an electronic camera and a printer, for instance, are connected to the USB hub without use of any host computer, it is impossible to transmit or receive the data when it is sought to print out image data of the electronic camera.

SUMMARY OF THE INVENTION

The present invention has been made in view of the above problem, and it has an object of providing an electronic imaging system, which permits optimum processing in dependence on whether any other host data processing unit is connected to the USB.

According to an aspect of the present invention, there is provided an electronic imaging system capable of permitting communication with an external unit via a universal serial bus, comprising: a host control means for collectively controlling an external unit connected via the universal serial bus as a host; a host detecting means for detecting that an external unit constituting a host data processing unit to the universal serial bus; and a mode setting means for setting a host mode permitting the operation of the host control means when the host detecting means detects no host data processing unit and also setting a terminal mode permitting operation under control of a host data processing unit when the host detecting means detects the host data processing unit.

The electronic imaging system further comprises a display means for displaying the mode set by the mode setting means and also displaying the kind of an external unit controlled by the host control means when the host mode is set by the mode setting means.

The electronic imaging system further comprises a data converting means for converting image data to data capable of being printed out in a printer, data generated as a result of data conversion in the data converting means being outputted, when a printer is connected as an external unit in the host mode set by the mode setting means, as image data to the printer.

The electronic imaging system further comprises a data converting means for converting image data to data capable of being stored in a data storing unit, data generated as a result of data conversion in the data converting means being outputted, when a data storing unit is connected as an external unit in the host mode set by the mode setting means, as image data to the data storing unit.

Other objects and features will be clarified from the following description with reference to attached drawings.

PREFERRED EMBODIMENTS OF THE INVENTION

Preferred embodiments of the present invention will now be described with reference to the drawings.

Figure 1:
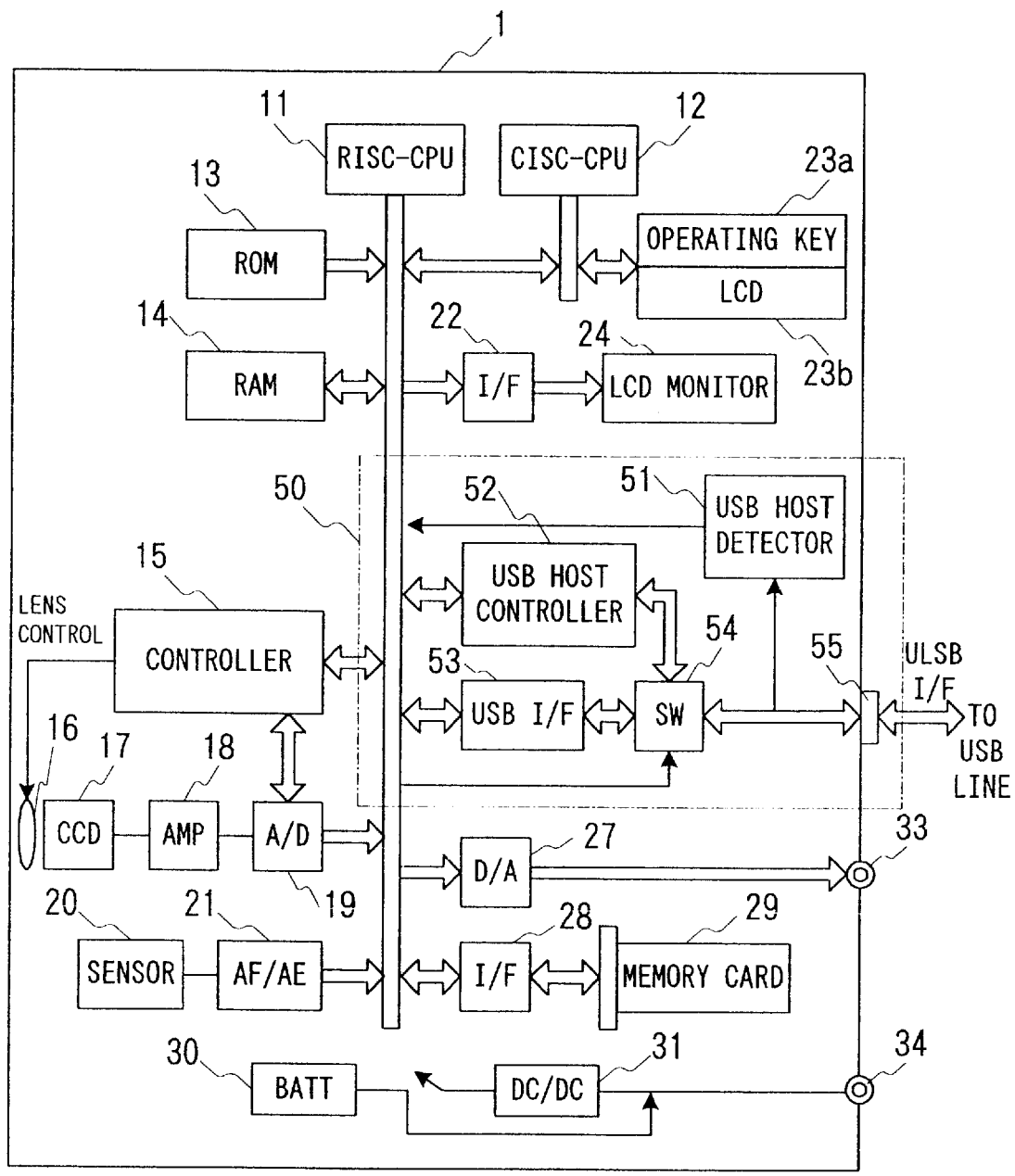
FIG. 1 is a block diagram showing an embodiment of the electronic camera according to the present invention.
Figure 2:
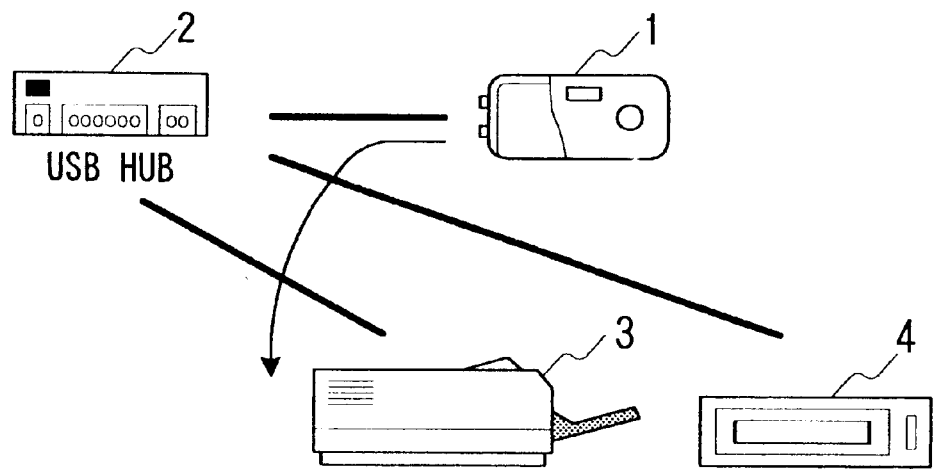
FIG. 2 is a view showing an example of connection of the electronic camera 1 as host unit to the USB.
Figure 3:
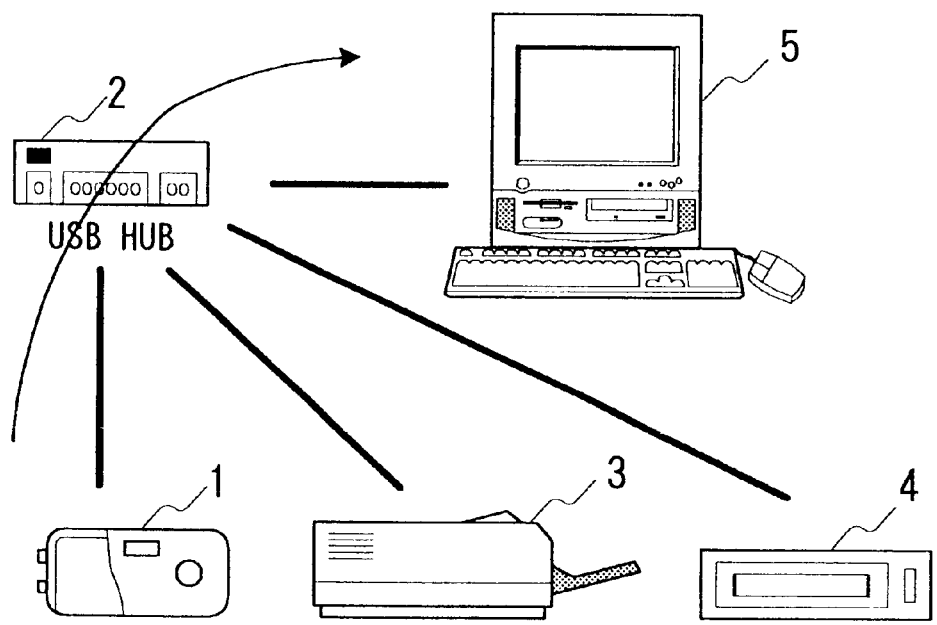
FIG. 3 is a view showing an example of connection of the electronic camera as unit terminal to the USB.

FIG. 1 is a block diagram showing an eobodiment of the electronic camera according to the present invention. FIG. 2 is a view showing an example of connection of the electronic camera 1 as host unit to the USB. FIG. 3 is a view showing an example of connection of the electronic camera as a unit terminal to the USB.

The electronic camera shown in FIG. 1 has a usual imaging function, and it comprises, as means for converting a scene image to an image signal under control of an RISC-CPU 11 and an image processing means for converting the image signal thus obtained to image data, a lens system 16, a CCD 17, an amplifier 18, an A/D converter 19, a lens system controller 15 and a RAM 14.

The electronic camera 1, comprises a light-measuring, distance-measuring sensor 20, a controller (i.e., AF/AE circuit) 21, a liquid crystal monitor 24 for displaying an image to be imaged or recorded, a monitor interface 22, an operating key 23a for causing predetermined operation of the electronic camera, an LCD 23b for displaying various contents, a CISC-CPU 12 for controlling circuits requiring relatively low processing rates, a D/A converter 27 for outputting a video signal to an external display, a video output terminal 33, a detachably mounted memory card 29 for recording the image data obtained by the electronic camera 1, a memory card interface 28, a battery 30 as a power supply for the electronic camera 1, an external power supply terminal 34 for using an external power supply, and a DC/DC converter 31. The above camera elements themselves are well known in the art, and are the same as those provided in the usual electronic camera. Thus, these elements are not described.

The electronic camera 1 further comprises an USB interface unit 50, which permits data communication with an external unit via the USB. When the electronic camera 1 is connected to the USB, it checks whether any other host data processing unit is connected to the bus, thereby selectively setting either a host mode, in which the camera functions as host, or a terminal mode, in which the camera functions as a terminal unit.

To provide these functions, the USB interface unit 50 includes an USB host detector 51, an USB host controller 52, an USB interface 53, a mode switch 54 and a connector 55. The USB host detector 51 checks whether any other host data processor (such as the personal computer 5 as shown in FIG. 3) is connected to the USB, and provides the detected result to the RISC-CPU 11. The USB host controller 52 controls the data communication with an external terminal unit other than the electronic camera 1 when the camera serves as host unit on the USB (see FIG. 2). The USB interface 53 becomes necessary when a host data processor other than the electronic camera (i.e., personal computer 5) is connected to the USB and functions as terminal unit. The switch 54 is controlled by the RISC-CUP 11 to switch the host mode and the terminal mode one over, to the other according to the result of host check by the USB host detector 51. The connector 55 is provided for connecting the electronic camera 1 to the USB.

The check result by the USB host detector 51 is provided to the RISC-CPU 11. When it is detected by the check that no host data processor other than the electronic camera 1 is connected to the USB so that the camera 1 serves as host unit (see FIG. 2), the mode switch 54 selects the USB controller 52 under control of the RISC-CPU 11.

When it is detected by the check that a host data processor other than the electronic camera (i.e., personal computer 5) is connected to the USB so that the camera serves as terminal unit (see FIG. 3), the mode switch 54 selects the USB interface 53 under control of the RISC-CPU 11.

When the USB host controller 52 is selected by the mode switch, 54, the electronic camera 1 serves as host on the USB, and the USB host controller 52 collectively controls other external terminal units (such as printer 3 and data storing unit 4 as shown in FIG. 2) which are also connected to the USB.

Figure 6:
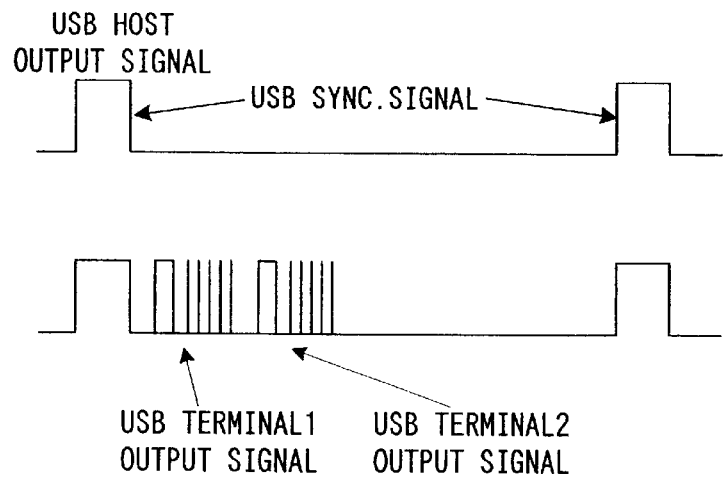
FIG. 6 is a timing chart of a USB synchronizing signal and USB terminal output signal in the embodiment.
Figure 7:
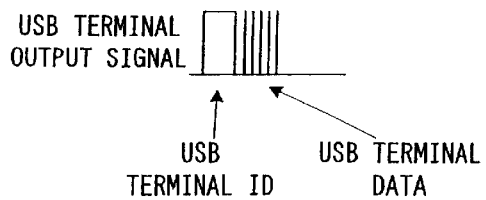
FIG. 7 is construction of each USB terminal output signal.

Now, external terminal unit control will be described. The USB controller 52 sends out a USB synchronizing signal as shown in FIG. 6 on the USB. In each cycle period of the synchronizing signal, the individual terminals send out USB terminal output signals which are different with different kinds of controlled terminals. As shown in FIG. 7, each USB terminal output signal is constituted by an ID code indicative of the kind of the controlled terminal and subsequent predetermined data thereof, for instance data capable of being printed out in case when the controlled terminal is a printer. In this way, the individual controlled terminal units are controlled in dependence on their ID codes.

Referring to FIG. 1 again, when the USB interface 53 is selected by the mode switch 54, the electronic camera 1 serves as terminal unit on the USB, and is controlled by a host data processor (for instance the personal computer 5 shown in FIG. 3), which is connected via the USB interface 53 to the USB under control of the RISC-CPU 11.

Figure 4:
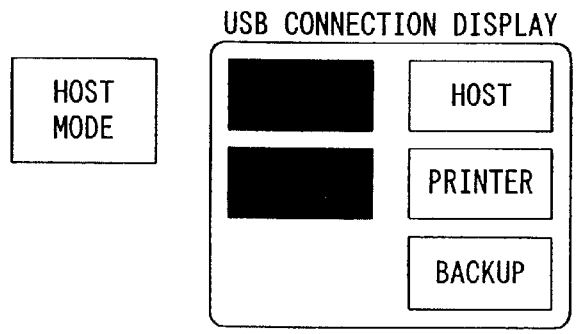
FIG. 4 is an example of displays showing the kind of the external unit controlled as host unit.
Figure 5:
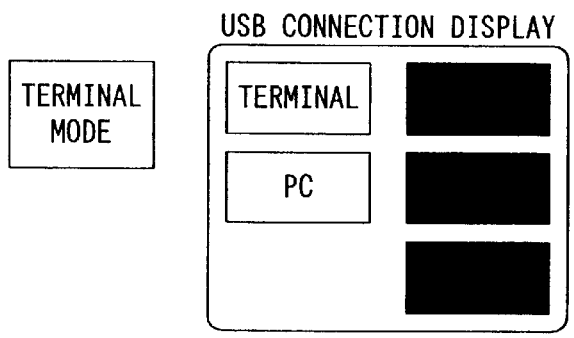
FIG. 5 is an example of display when the terminal mode is set.

Under control of the CISC-CPU 12, the LCD 23b displays either the host mode or the terminal mode of the electronic camera 1 that has been set. As shown in FIG. 4, when the host mode is set, the CISC-CPU 12 displays the kind of the external unit that is controlled as a terminal unit. FIG. 5 shows the content displayed when the terminal mode is set.

When the host mode is set, the embodiment of the electronic camera 1 sends out the recorded image data after conversion to the data having a predetermined configuration in dependence on the kind of the external terminal unit controlled as host unit. This function control is made according to predetermined data stored in the ROM 13 by the RISC-CPU 11.

As a specific example, when the controlled external terminal is a printer (see printer 3 as shown in FIG. 2), the image data in the electronic camera 1 is converted to decompressed and color-converted image data capable of being printed out. A program for this data conversion is stored in the ROM 13, and the RISC-CPU 11 executes the data conversion on the basis of this program.

When the controlled external terminal is a data storing unit such as a magneto-optic disk read/write unit (see data storing unit 4 as shown in FIG. 2), the above image data is sent out as data capable of being stored in the data storing unit, i.e., usual compressed data. Again this control is executed by the RISC-CPU 12.

Figure 8:
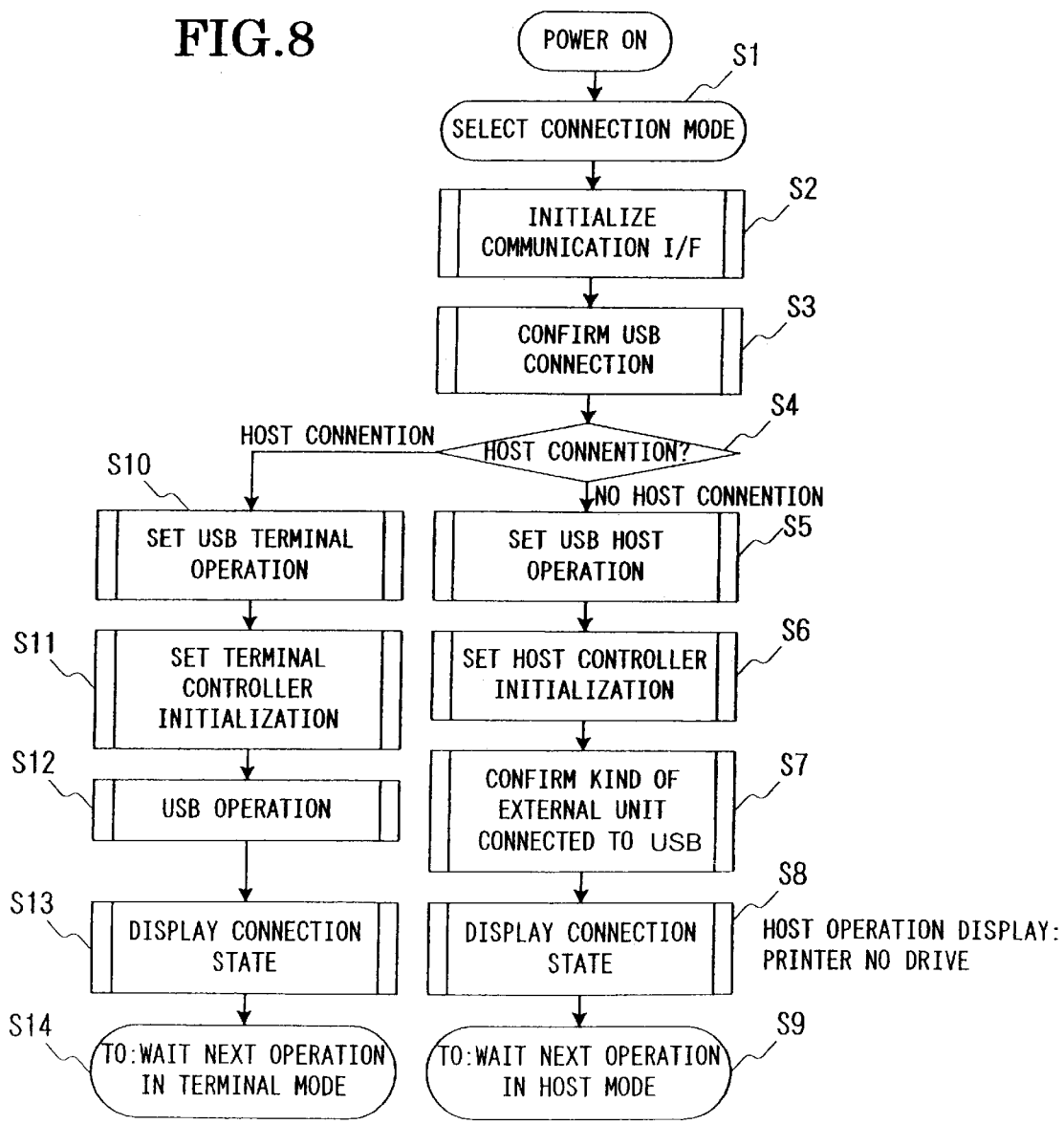
FIG. 8 is flow chart of the function of the embodiment of the electronic camera according to the present invention.
Figure 9:
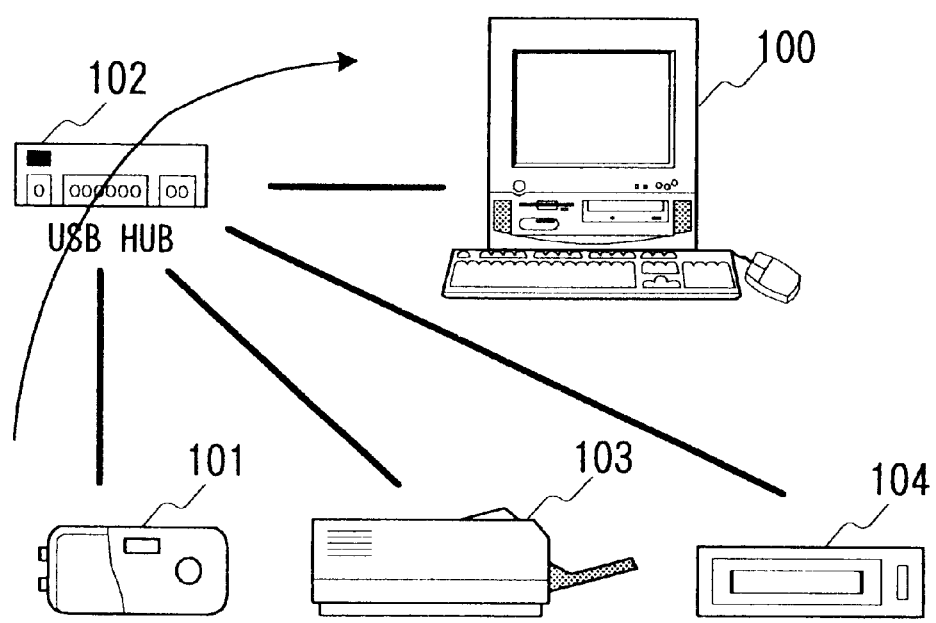
FIG. 9 is a view for describing an example of data utilizing application of an electronic camera connected to USB with a personal computer connected thereto as a host.

The function of the embodiment of the electronic camera having the above construction will now be described with reference to the flow chart of FIG. 8.

When the power supply of the electronic camera 1 is turned on, step S1 of selection flow of the connection mode is executed. Then, the RISC-CPU 11 initializes the communication interface according to a program stored in the ROM 13 (step S2). Next, the RISC-CPU 11 confirms the connection to the USB (step S3). Then, the RISC-CPU 11 checks whether a host data processor other than the electronic camera 1 is connected to the USB (step S4) on the basis of the detected result from the USB host detector 51.

Detecting in the check that no other host data processor is connected to the USB (see FIG. 2), the RISC-CPU 11 sets a predetermined USB host operation (step S5). Specifically, the RISC-CPU 11 selects the USB host controller 52 by operating the mode switch 54. Now, the electronic camera 1 serves the role of a host unit on the USB.

In subsequent step S6, the RISC-CPU 11 controls initialization of the USB host controller 52, and then it checks whether an external unit other than the electronic camera 1 is connected to the USB. When detecting that an external unit is connected, the RISC-CPU confirms the kind of the external unit (step S7). Also, the CISC-CPU 12 causes display of kind of the external unit, confirmed in the step S7, on the display LCD 23b (step S8, see FIG. 4). Thereafter, the RISC-CPU 12 and the USB host controller 52 wait for the next operation to be executed with the electronic camera 1 in the host mode (step S9).

When detecting in the check step S4 that no other host data processor than the electronic camera 1 is connected to the USB (see FIG. 3), the RISC-CPU 11 sets a predetermined USB terminal operation (step S10). Specifically, the RISC-CPU 11 selects the USB interface 53 by operating the mode switch 54. Now, the electronic camera 1 serves the role of a terminal unit on the USB.

In subsequent step S11, the RISC-CPU 11 controls initialization of the terminal unit. Then, the RISC-CPU 11 receives control from the host data processor connected to the USB (step S12). Also, the CISC-CPU 12 causes display of the prevailing terminal mode on the LCD 23b (step S13, see FIG. 5). Thereafter, the RISC-CPU 11 waits the next operation to be executed with the electronic camera 1 in the terminal mode (step S14).

As has been shown, this embodiment of the electronic camera leaves control to a host such as a personal computer, if any, on the USB it is connected to, while it serves as a host by itself for optimum control of other terminal unit or units via the USB when no personal computer or like host is connected aside from the other terminal unit or units to the USB.

When the electronic camera 1 is a host, it sends out normal compressed data as image data to a data storing unit or like medium system, which may be connected as controlled terminal, while it sends out expanded color-converted image data to a printer or the like, which may be connected as controlled terminal.

As has been described in the foregoing, according to the present invention it is possible to provide an electronic imaging system, which performs optimum processing in dependence on whether any other host data processor than itself is connected to the USB.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An electronic imaging system capable of permitting communication with an external unit via a universal serial bus, comprising:
   a connector for connecting the electronic imaging system to the universal serial bus;
   host detecting means, connected to the connector, for detecting whether or not an external host data processing unit is connected to the universal serial bus;
   switching means connected to the connector; and
   host controlling means, connected to said switching means, for setting a host mode permitting the operation of the host controlling means when the host detecting means detects no host data processing unit on the universal serial bus, and also setting a terminal mode permitting operation under control of the external host data processing unit when the host detecting means detects the external host data processing unit.

2. The electronic imaging system according to claim 1, which further comprises display means for displaying the mode set by the host controlling means and also displaying the kind of an external unit controlled by the host control means when the host mode is set by the host controlling means.

3. The electronic imaging system according to claim 1, which further comprises data converting means for converting image data to data capable of being printed out in a printer,
   wherein data are generated as a result of data conversion in the data converting means being outputted, when a printer is connected as an external unit in the host mode set by the host controlling means, as image data to the printer.

4. The electronic imaging system according to claim 1, which further comprises data converting means for converting image data to data capable of being stored in a data storing unit,
   wherein data is generated as a result of data conversion in the data converting means being outputted, when a data storing unit is connected as an external unit in the host mode set by the host controlling means, as image data to the data storing unit.

5. An electronic imaging system comprising:
   a) means for generating an image signal from an image scene;
   b) a connector for coupling the electronic imaging system with a universal serial bus;
   c) a detector for determining whether or not a host, other than the electronic imaging system, is coupled with the universal serial bus;
   d) a universal serial bus host controller;
   e) a universal serial bus interface; and
   f) a switch for selectively connecting one of the universal serial bus host controller and the universal serial bus interface with the connector.

6. The electronic imaging system of claim 5 wherein when the detector determines that a host, other than the electronic imaging system, is connected to the universal serial bus, the switch selectively connects the universal serial bus interface with the connector.

7. The electronic imaging system of claim 5 wherein when the detector determines that no host, other than the electronic imaging system, is connected to the universal serial bus, the switch selectively connects the universal serial bus host controller with the connector.

8. The electronic imaging system of claim 5 wherein when the detector determines that no host, other than the electronic imaging system, is connected to the universal serial bus, the switch selectively connects the universal serial bus host controller with the connector, and
   wherein the serial bus host controller determines a type of a terminal device coupled with the universal serial bus.

9. The electronic imaging system of claim 8 wherein if the terminal device coupled with the universal serial bus is a printer type, then the image signal is decompressed.

10. The electronic imaging system of claim 8 wherein if the terminal device coupled with the universal serial bus is a printer type, then the image signal is color-converted.

11. The electronic imaging system of claim 8 wherein if the terminal device coupled with the universal serial bus is a printer type, then the image signal is decompressed and color-converted.

12. The electronic imaging system of claim 8 wherein if the terminal device coupled with the universal serial bus is a disk storage unit type, then the image signal is sent, as a compressed image, to the terminal device.

13. The electronic imaging system of claim 5 further comprising:

g) a display for displaying a host mode indication when the switch connects the universal serial bus host controller with the connector.

14. The electronic imaging system of claim 13 wherein the display further displays a type of a terminal connected with the universal serial bus.

15. The electronic imaging system of claim 5 further comprising:

g) a display for displaying a terminal mode indication when the switch connects the universal serial bus interface with the connector.

16. The electronic imaging system of claim 15 wherein the display further displays a type of a terminal connected with, and hosting, the universal serial bus.

17. The electronic imaging system of claim 5 wherein when the detector determines that a host, other than the electronic imaging system, is connected to the universal serial bus, the switch selectively connects the universal serial bus interface with the connector, and wherein when the detector determines that no host, other than the electronic imaging system, is connected to the universal serial bus, the switch selectively connects the universal serial bus host controller with the connector.

18. A method for use with an electronic imaging system having means for generating an image signal from an image scene and a connector for coupling the electronic imaging system with a universal serial bus, the method comprising steps of:

a) determining whether or not a host, other than the electronic imaging system, is coupled with the universal serial bus; and b) selectively operating the electronic imaging system as one of a host and a terminal such that i) if it is determined that no host, other than the electronic imaging system, is connected to the universal serial bus, then connecting a universal serial bus host controller with the universal serial bus, and ii) if it is determined that a host, other than the electronic imaging system, is connected to the universal serial bus, then connecting a universal serial bus interface with the universal serial bus.

19. A method of claim 18 wherein if it is determined that no host, other than the electronic imaging system, is connected to the universal serial bus, then further performing a step of:

c) determining a type of a terminal device coupled with the universal serial bus.

20. The method of claim 18 further comprising a step of:

c) displaying one of a host mode indication and a terminal mode indication based on the determination made in step (a).

21. An electronic imaging apparatus adapted for use with a universal serial bus, comprising:

a universal serial bus connector provided for connection of the electronic imaging apparatus to the universal serial bus;

a guest interface unit configured to operate the electronic imaging apparatus as a universal serial bus guest unit;

a host interface unit configured to operate the electronic imaging apparatus as a universal serial bus host controller;

an external host detector unit connected to the universal serial bus connector configured to detect presence of an external universal serial bus host controller unit on the universal serial bus; and a switching unit, connected among the universal serial bus connector, the guest interface unit and the host interface unit, configured to enable either one of the guest interface unit and the host interface unit exclusively according to the output of the external host detector unit.

* * * * *